United States Patent
Golden (10) Patent No.: US 8,934,923 B1
(45) Date of Patent: Jan. 13, 2015

(54) SYSTEM AND METHOD FOR GEO-POSITIONING GUIDANCE WITH RESPECT TO A LAND TRACT BOUNDARY

(76) Inventor: John Michael Golden, Pell City, AL (US)

( * ) Notice: Subject to any disclaimer, the term of this patent is extended or adjusted under 35 U.S.C. 154(b) by 0 days.

(21) Appl. No.: 13/525,290

(22) Filed: Jun. 16, 2012

Related U.S. Application Data (60) Provisional application No. 61/497,842, filed on Jun. 16, 2011, provisional application No. 61/551,842, filed on Oct. 26, 2011.

(51) Int. Cl.
*H04W 4/02* (2009.01)

(52) U.S. Cl.
USPC .......................... 455/457; 455/426.1; 709/202

(58) Field of Classification Search
USPC ............ 455/426.1, 552, 456.1; 370/259, 252; 709/202
See application file for complete search history.

(56) References Cited

U.S. PATENT DOCUMENTS

| 8,378,815 B1* | 2/2013 | McNulty et al. .......... 340/539.13 |
| 2005/0205719 A1* | 9/2005 | Hendrickson et al. .... 246/122 R |
| 2006/0135180 A1* | 6/2006 | Jakel et al. ................. 455/456.5 |
| 2013/0174076 A1* | 7/2013 | Geelen .......................... 715/771 |

* cited by examiner

*Primary Examiner* — Phuoc H Doan
(74) *Attorney, Agent, or Firm* — Butler Snow LLP (57) ABSTRACT

A system and method provides for the real-time geo-position monitoring of a handheld device and the continual calculation of its relational position with respect to the boundary of a tract of land in which the device is situated. The invention utilizes existing geo-positioning systems within mobile devices and a software application to compare the position of the device, and thereby its user, with the boundary of a track of land having its geo-position attributes uploaded into or accessed by the device. Audible and visual cues are presented to a user to allow them to know their current position relative to a land tract's boundary or predefined buffer zone adjacent to the tract's boundary. The system accommodates the access and uploading of geo-position information of a tract of land and the recordation of movements with respect to the boundaries of the tract of land in a remote database.

20 Claims, 7 Drawing Sheets

SYSTEM AND METHOD FOR GEO-POSITIONING GUIDANCE WITH RESPECT TO A LAND TRACT BOUNDARY

This application claims the benefit of filing priority under 35 U.S.C. §119 and 37 C.F.R. §1.78 of the U.S. Provisional Application Ser. No. 61/497,842 filed Jun. 16, 2011, for a Software Algorithm For Mobile Devices Using Position Sensor To Lock User Position Within Boundary Lines, and U.S. Provisional Application Ser. No. 61/551,842 filed Oct. 26, 2011, for a Dog Collar with Aural Cues and Tract-Lock GPS Technology. All information disclosed in those prior pending provisional applications are incorporated herein by reference.

FIELD OF THE INVENTION

The present invention relates generally to devices using geo-positioning software and hardware to determine an Earth-based location. In greater particularity, the present invention relates to GPS position and prediction methods. In even greater particularity, the present invention relates to the calculation of geo-positioning boundaries with respect to a user's current location on a geo-positionally known tract of land.

BACKGROUND OF THE INVENTION

The use of global positioning systems (GPS) to determine the terrestrial position of a portable device is well-known in the art. For instance, U.S. Pat. No. 5,375,059 to Kyrtsos et al., U.S. Pat. No. 5,438,517 to Sermon et al., and U.S. Pat. No. 5,490,073 to Kyrtsos each describe a navigational system for vehicles utilizing the electromagnetic signals received from GPS satellites. The aforementioned patents (U.S. Pat. No. 5,375,059; U.S. Pat. No. 5,438,517; U.S. Pat. No. 5,490,073) are hereby incorporated by reference in their entireties.

A global positioning system works by utilizing a network of GPS satellites that continuously transmit signals to the Earth; the data transmitted by these signals includes the precise time at which the signal was transmitted by the satellite. By noting the time at which the signal is received at a GPS receiver, a propagation time delay can be calculated. By multiplying the propagation time delay by the signal's speed of propagation, the GPS receiver can calculate the distance between the satellite and the receiver. This calculated distance is called a "pseudorange," due to error introduced by the lack of synchronization between the receiver clock and GPS time, as well as atmospheric effects. Using signals from at least three satellites, at least three pseudoranges are calculated, and the position of the GPS receiver is determined through a geometrical triangulation calculation.

When GPS signals are not available, the position of a portable device may also be calculated through other means, such as a dead-reckoning system incorporating an accelerometer. For instance, U.S. Pat. No. 5,606,506 to Kyrtsos and U.S. Pat. No. 6,308,134 to Croyle et al. each describe navigational systems integrating both GPS and dead-reckoning techniques. U.S. Patent Publication No. 2007/0260398 to Stelpstra further describes a device that calculates calibration parameters for its accelerometer while GPS data is available, enabling the device to determine its position exclusively using data derived from the accelerometer when GPS data is unavailable. The aforementioned patents and patent publications (U.S. Pat. No. 5,606,506; U.S. Pat. No. 6,308,134; U.S. Patent Publication No. 2007/0260398) are hereby incorporated by reference in their entireties.

Certain currently available GPS systems also utilize remote databases to store GPS related information, which is then communicated to a portable device. U.S. Pat. No. 6,222,483 to Twitchell et al., for example, discloses a GPS location system for mobile phones in which the GPS satellite information is stored in a database on a server accessed via an Internet interface. The aforementioned patent (U.S. Pat. No. 6,222,483) is hereby incorporated by reference in its entirety.

However, most commercial enterprises that rely on GPS based positioning systems use that information in conjunction with physical land tract information. For example, surveyors typically use GPS in conjunction with traditional geometrical calculations to mark land tract perimeter angles to produce a valid land survey. Further, construction crews hire surveyors to install physical markers on land tracts so that their equipment does not stray outside of authorized construction areas. And, logging operations typically use satellite photos in conjunction with GPS information to navigate harvesting activities in authorized land parcels.

Therefore, what is needed is an integration of current geo-positioning techniques with accurate land tract information so that land tract navigation would be facilitated and simplified.

SUMMARY OF THE INVENTION

In summary, the invention is a system and method for the real-time geo-position monitoring of a handheld device and the continual calculation of it relational position with respect to the boundary of a tract of land in which the device is situated. The invention utilizes existing geo-positioning systems within mobile devices and a software application to compare the position of the device, and thereby its user, with the boundary of a tract of land having its geo-position attributes uploaded into or accessed by the device. Audible and visual cues are presented to a user to allow them to know their current position relative to a land tract's boundary or predefined buffer zone adjacent to the tract's boundary.

BRIEF DESCRIPTION OF THE DRAWINGS

A system and method for geo-positioning guidance with respect to a land tract boundary incorporating the features of the invention is depicted in the attached drawings which form a portion of the disclosure and wherein.

DESCRIPTION OF THE PREFERRED EMBODIMENTS

Figure 1:
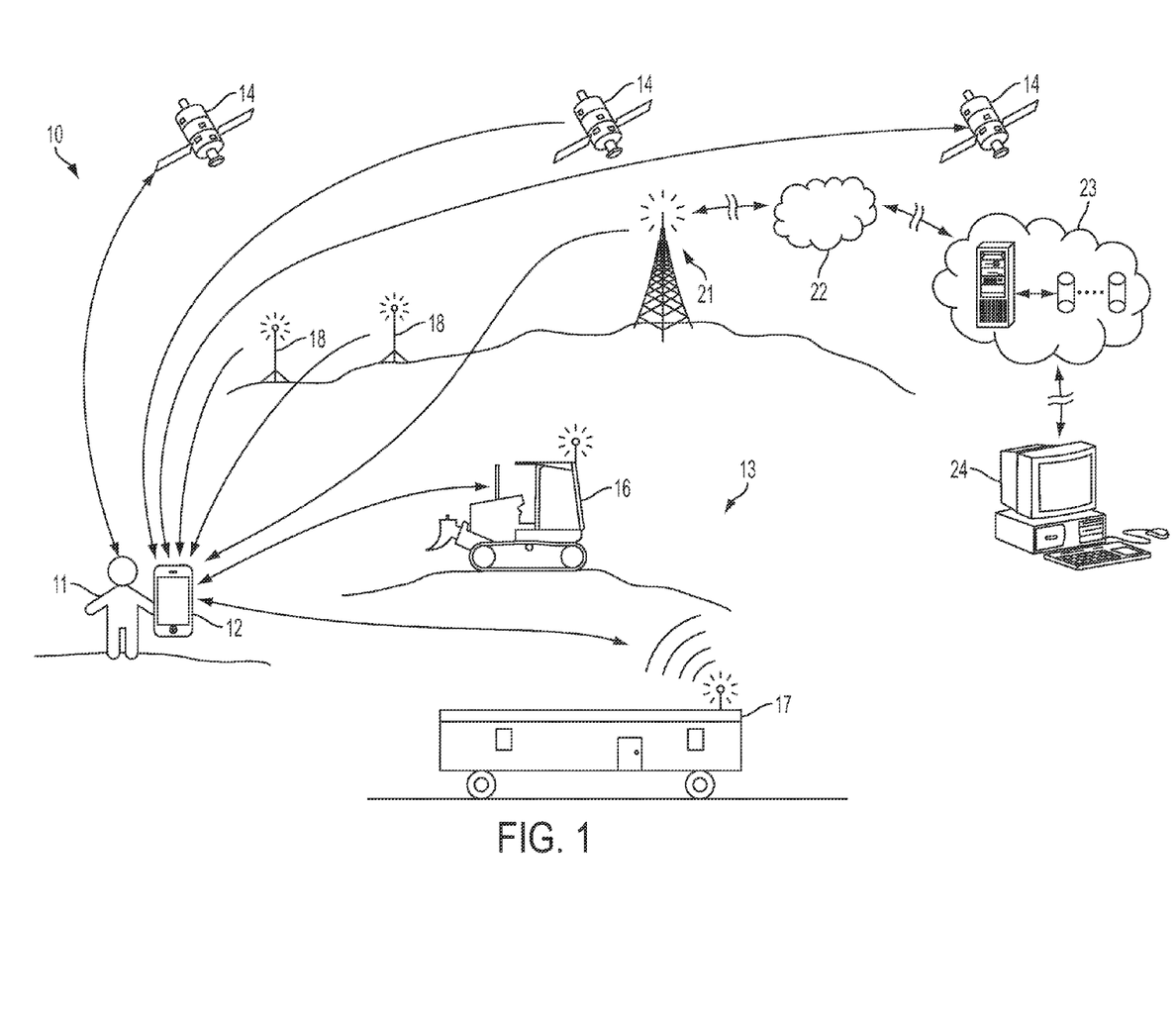
FIG. 1 is a general communication system infrastructure diagram showing how a mobile device used in the system is connected to various communication elements of the system.

Referring to the drawings for a better understanding of the function and structure of the invention, FIG. 1 shows a schematic view of the communications infrastructure 10 utilized by the present invention during typical use in a land development scenario. In this sample scenario, a field worker 11 desires to acquire boundary information for the tract of land 13 being cleared by bulldozer 16. The user initiates a software application 28 on mobile device 12, which includes receivers capable of detecting signals originating from GPS satellites 14, WiFi repeater/booster stations 18, one or more cell towers 21, construction trailer 17 with an Internet access point, or even a mobile access point on bulldozer 16.

By connecting with the Internet 22 via WiFi, Bluetooth, or cell transmissions, the software application can access boundary data stored in a SQL relational database 36 on a remote server, such as cloud server 23. The data contained on cloud server 23 can also be accessed and modified by remote computing device 24, such as a PC, via an Internet connection.

Figure 2:
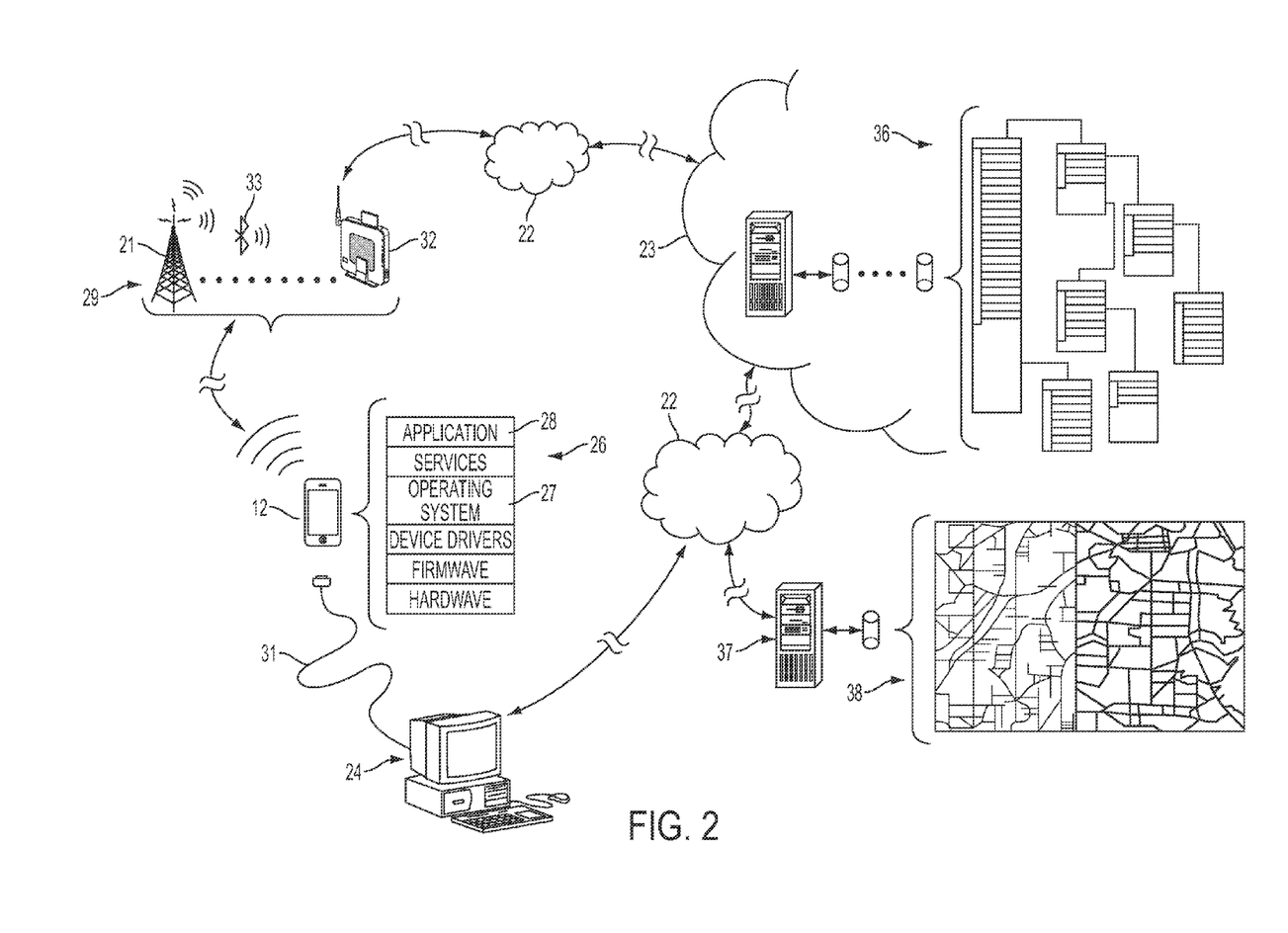
FIG. 2 is a diagram showing how a device records and obtains geo-position and land tract information.

FIG. 2 illustrates the communication of geo-positional data to and from mobile device 12. Mobile system 26 encompasses the components allowing mobile device 12 to operate as a geo-positioning device, including the device's hardware, firmware, device drivers, operating system 27, services, and software application 28. Mobile device 12 can communicate with external systems by establishing a connection with the Internet 22 via wireless transceivers 29, including cell tower 21, Bluetooth apparatus 33, and WiFi router 32. Via the aforementioned Internet connections, mobile device 12 can send and receive data to and from a remote server, such as cloud server 23. Geo-positional data is then stored on the remote server in a SQL relational database 36.

Alternatively, mobile device 12 can send and receive data to and from PC 24 via a wired interface 31, such as a USB connection. PC 24 can also access land tract data sets 38, stored on server 37, via an Internet connection, thereby allowing the transference od such land tract data over connections 31 to device 12.

Figure 3:
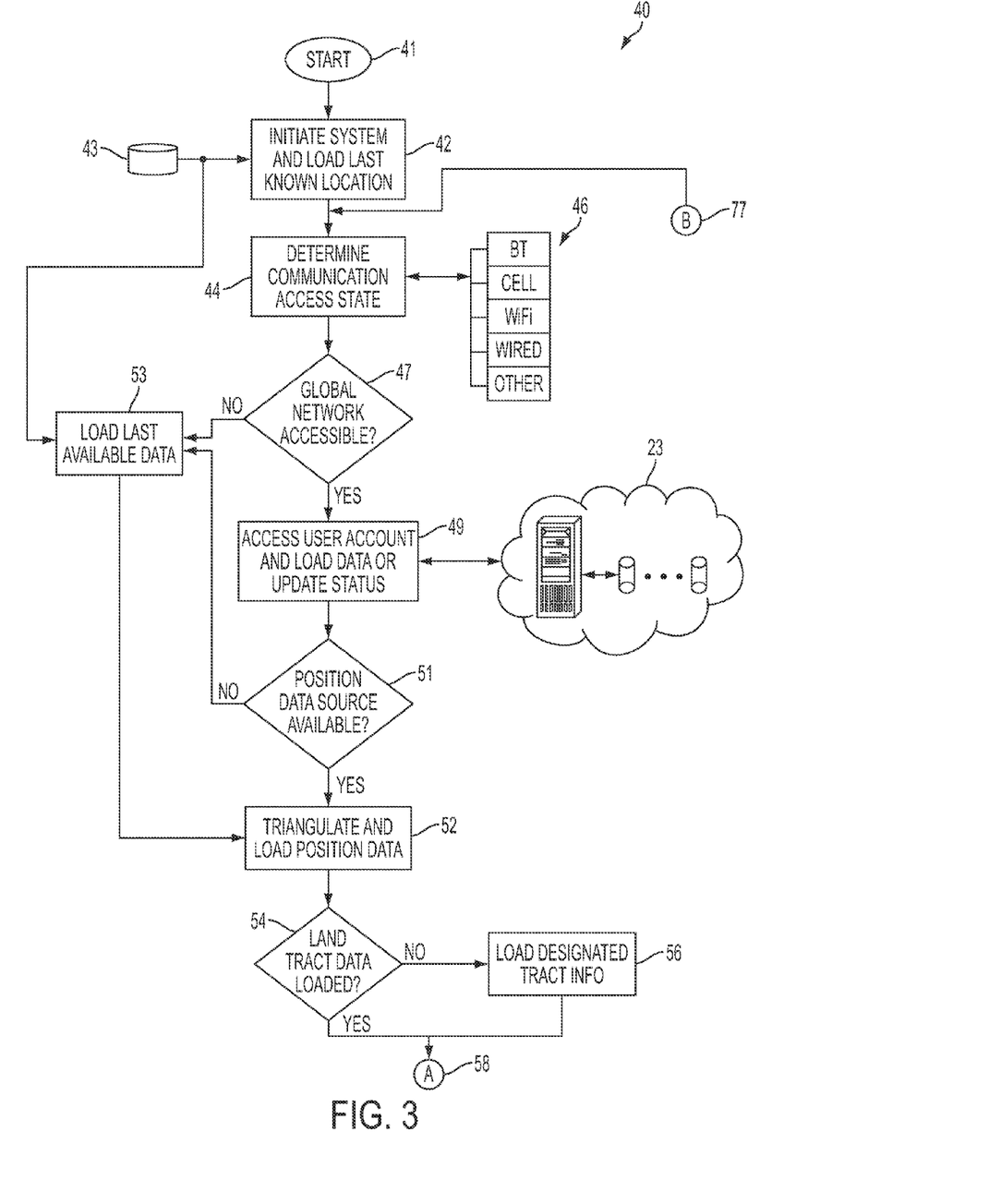
FIG. 3 is a process flow diagram showing a portion of the invention.

FIG. 3 illustrates the process by which the software algorithm of the present invention determines a user's terrestrial position. As discussed previously, a user who wishes to determine his or her position will initiate the software application 28 on mobile device 12. Upon initiation 42, the software application will retrieve and load last-known position data from the local storage 43 in the mobile device 12. After loading the last-known position data, the software algorithm determines 44 the most appropriate communication access state, choosing among the available communication paths 46, which, depending on signal strength and availability, could include communication via Bluetooth, cell, WiFi, wired, or other such methods. The software algorithm ranks the various communication paths 46 in real time, basing its ranking on signal strength, transmission speed, and other such factors that affect the efficiency of data transmission. Once the optimal communication path 46 is chosen, the software algorithm determines 47 whether the chosen communication path 46 will allow it to access the Internet. If the software is unable to access the Internet with the chosen communication path 46 (e.g., if the signal were too weak to provide an adequate connection), FIG. 3 illustrates a method by which the software uses the last-known position data previously retrieved from local storage 43 to calculate 52 the user's current position, a process which is detailed below. In other embodiments of the invention, however, position data produced by dead-reckoning techniques, such as an accelerometer-based method, may be used in place of the last-known position data.

If the chosen communication path 46 will allow the software to access the Internet, it will access 49 the user's account on cloud server 23. The software will communicate with the server to record data indicating the user's current geo-positional location and/or update the status of the user's position with respect to a boundary.

Once the software application has communicated with cloud server 23, the software determines 51 whether a position data source is available. Again, FIG. 3 illustrates a process in which GPS positioning is the method used to calculate the user's current location, but other embodiments of the present invention would utilize various methods of location determination, including a system integrating GPS positioning with accelerometer-based dead-reckoning.

In order to determine whether a position data source is available, the software communicates with a GPS receiver located in mobile device 12. If at least three GPS signals are available, the software uses the time stamp obtained from each signal to calculate a pseudorange for each satellite. Once the pseudoranges have been calculated, the algorithm geometrically triangulates 52 the terrestrial position of mobile device 12 and records the resulting position data as the user's current location. In the preferred embodiment of the invention, accuracy of geo-position data is increased by utilizing multiple position calculations, including triangulation based on signals from GPS satellites, cell towers, and WiFi transceivers, as well as data obtained from an accelerometer-based dead-reckoning system. Additionally, a differential "receiver autonomous integrity monitoring" ("RAIM") method may be applied to data received from the GPS, cell tower, or WiFi transceiver signals. The RAIM method utilizes data obtained from redundant sources (i.e., signal sources above the minimum number required for triangulation) to estimate the statistical probability of inaccuracy in a device's calculated geo-position. Further, the preferred embodiment of the invention utilizes a NIST-calibrated time stamp to calculate and compensate for geo-positioning error resulting from inaccuracies in the time stamps contained in GPS, WiFi, and cell signals used for triangulation, as well as inaccuracies in the internal clock of components of mobile device 12. The preferred embodiment of the invention utilizes NIST-calibrated time data obtained from a remote server. One example of a provider of time data with a NIST Certificate of Calibration is Certichron, Inc. A further embodiment of the invention would utilize a nearby base station with a known location. Geo-positioning data for the local base station would be obtained via GPS, WiFi, and cell signal triangulation methods and utilized to further calculate and compensate for inaccuracies associated with the geo-position data obtained for mobile device 12. Through one or a collection of the above strategies, accurate geographical location to within a few inches for a device may be routinely obtained.

Once the software had obtained position data via any of the above-discussed methods, the software will then determine 54 whether data associated with the tract of land surrounding the user's current position has been loaded. If not, the software will load 56 the designated land tract data, if available.

Figure 4:
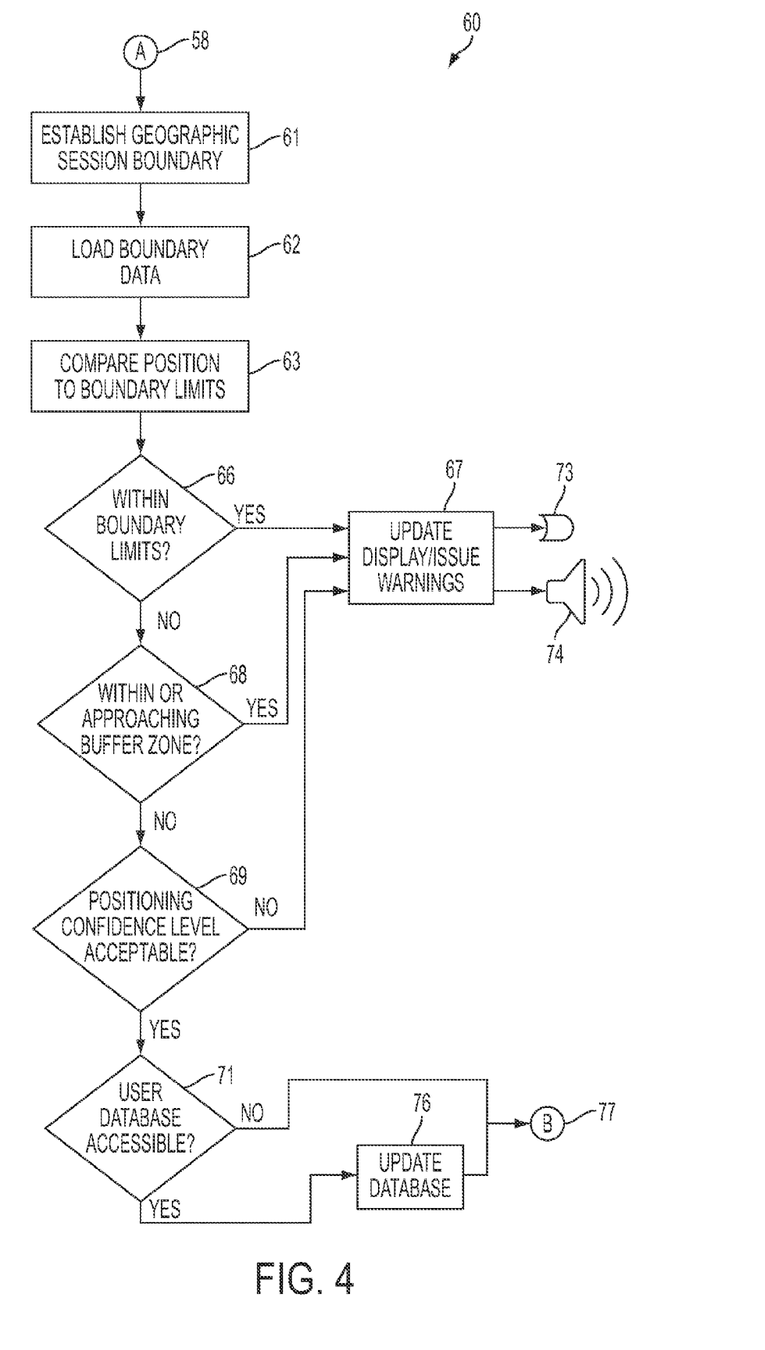
FIG. 4 is a process flow diagram showing another portion of the invention and including the boundary calculation and user notification steps.
Figure 5:
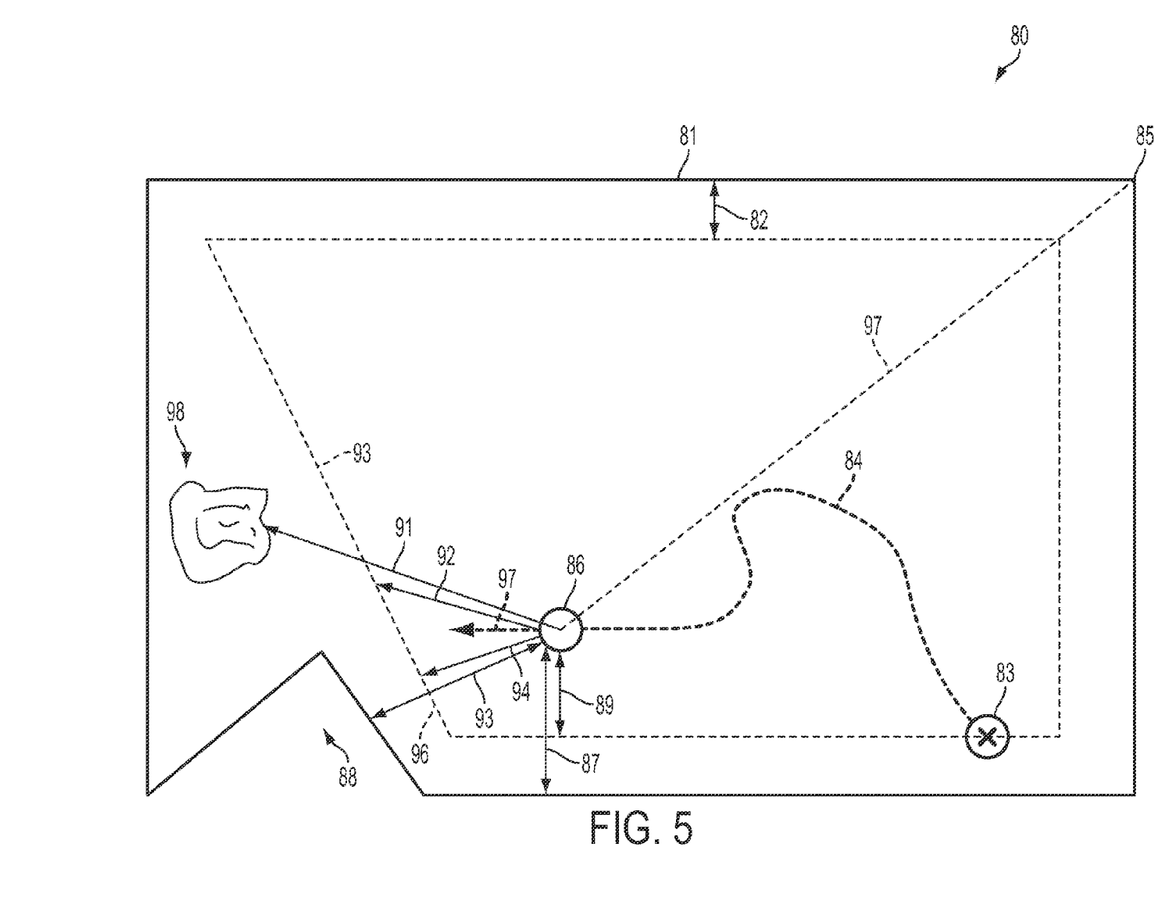
FIG. 5 is a diagram to show how the steps of FIGS. 3 and 4 are implemented in a real world scenario.

Referring now to FIG. 4, the software proceeds to establish 61 a geographic boundary for the session. In one method, a data file with coordinates for a pre-specified boundary could be downloaded to the mobile device. In another embodiment, the user could specify that the boundary relating to the particular tract of land (e.g., a property line) be established as the boundary for the session. In an additional embodiment, a boundary data set could be created by the user by pinpointing vertices of a polygon on a map of the tract on a remote computing device and uploading the data set directly to the mobile device or via database 36. FIG. 5 shows an example 80 of a user moving around a land tract with an established tract boundary 81 through one of the above mentioned methods.

In a preferred embodiment of the invention, a user could "draw" the boundary directly onto a map of the tract in a software application coupled electronically with device 12 or database 36. In this embodiment, mobile device 12 would include a touch-sensitive screen apparatus; when the user touches a point on the map of the tract shown on the device's screen, the application would record that point's geo-position coordinates. As the user touches successive points on the screen, the application would record a series of coordinates. Once the user defined the desired boundary on the map of the tract, the data set consisting of the series of coordinates would be used to establish that session's boundary. Further, in the preferred embodiment of the invention, each boundary defined by a user is stored in the SQL relational database 36, allowing the user to utilize the same boundary data set in later sessions.

Referring again to the example depicted in FIG. 5 and process 60 of FIG. 4, once the user chooses via the application interface the geographic boundary to be used in the session, the software loads 62 the boundary data and displays the boundary information on the application's map screen. The algorithm then compares 63 the user's current position 86 with the tract boundary 81 previously established for the session. If the software determines 66 that the user's current position is within the specified boundary limits, the software will update 67 the display screen to reflect the position of the user within the boundary lines.

If the software determines 66 that the user's current position is not within the specified boundary 81 for the session, the algorithm then determines 68 the user's position with respect to a buffer zone. Generally, the buffer zone will be defined by the user as a set distance 82 from any point on the boundary line (e.g., the user would like to receive a warning if he travels within 10 feet of any point on the boundary line). In another embodiment of the invention, the user could define a more specialized buffer zone (e.g., the user would like to receive a warning if he travels within 10 feet of a boundary line adjacent to another land tract, but would only like to receive a warning if he travels within 5 feet of a boundary line adjacent to a separate tract of land). In either case, the buffer zone may be defined either by the user in the software application itself, or by a remote user connected to a remote computing device with access to the server storing the SQL relational database. In the sample scenario depicted in FIG. 5, the user has chosen to define the buffer zone as a specified distance 82 from most of tract boundary 81, but has chosen to enlarge the buffer zone to include the entirety of marked avoidance area 98.

If the application determines 68 that the user's current position 86 is within the defined buffer zone, the application will update the display and issue a warning to the user. In the preferred embodiment, both a visual display warning 73 and an audible warning 74 are used to notify the user that he or she is within the buffer zone.

Even if the user's current location is not within the buffer zone, the application also uses predictive modeling to determine whether the user is approaching the buffer zone, based on the velocity vectors obtained from GPS/WiFi/cell tower triangulation data or data obtained from the mobile device's accelerometer or other dead-reckoning system. If the velocity vector data indicates that the user will enter the buffer zone within a time period that has been pre-specified by the user or a remote administrator (e.g., if the user will enter the buffer zone within 10 seconds), the application will update the display and issue a warning to the user indicating that the user is approaching the buffer zone. Again, in the preferred embodiment, both a visual display warning 73 and an audible warning 74 are used to notify the user that he or she is approaching the buffer zone.

If the application determines that the user's current position is within the specified tract's boundary and is neither in the buffer zone nor approaching the buffer zone, the application then determines 69 whether the positioning confidence level is within an acceptable range. In the preferred embodiment, the application calculates a confidence level based on weighted factors such as when the user's positioning data was most recently acquired, the sources from which positioning data was acquired, the range between the positioning coordinates obtained from various sources, and the like. However, it is recognized that a user might choose a simpler mode of calculating the confidence level (e.g., position data is within an acceptable confidence level only when GPS data has been obtained within the past two seconds).

If the application determines that the positioning confidence level is not within an acceptable range, the application will update 67 the display and issue a warning to the user indicating that the confidence level for the user's current position is not within an acceptable range. In the preferred embodiment, both a visual display warning 73 and an audible warning 74 are used to notify the user that the confidence level for the user's current position is not within an acceptable range.

After performing the steps discussed above, the application then determines 71 whether the mobile device 12 is able to communicate with cloud server 23. If so, the application updates the position data contained in the SQL relational database, recording the user's current location with respect to time, as well as a velocity vector to indicate the user's heading.

FIG. 5 may be used to illustrate the processes discussed above with respect to a real-world scenario. Initiation of the application 42 occurs at starting point 83. Once the user initiates the system, a map of the land tract 80 with boundary 81 will be shown on the screen of mobile device 12. Both the boundary 81 and the user's current position would be identified on the application's map screen. In this example scenario, the user's location upon initiation of the system is within the specified buffer zone. Immediately, the application would alert the user with a color-coded display and warning message, as well as an audible warning (such as a series of mid-frequency "beeping" sounds, which would escalate in pitch as the user approaches the boundary 81), indicating that the user's current position is within the buffer zone.

The user would then begin to walk along movement path 84. As the user walks, the application screen on mobile device 12 would track the user moving within the parcel in real-time. Additionally, if another individual desired to track the user's movement within the parcel, a remote computing device could retrieve the user's movement data from the database stored on cloud server 23. Since the remainder of movement path 84 is exclusively within tract boundary 81, the application screen would indicate, via both a color-coded display and an "in bounds" message, that the user's current position is within the boundary.

As the user reaches his current position 86, various types of data are displayed on the application screen. The software algorithm calculates and displays the distance 87 from the user's current position 86 to the nearest point on boundary 81, as well as the distance 89 from the user's current position 86 to the nearest point within the buffer zone. The software algorithm also calculates and displays velocity vector 97, based on the user's current bearing. As discussed previously, if the application determined, based on velocity vector 97, that the user would enter the buffer zone within a specified period of time, an "approaching buffer zone" warning would display on the application screen, along with an accompanying audible warning (such as a series of low-frequency "beeping" sounds, which would escalate in pitch as the user approaches the boundary 81).

In a further embodiment of the invention, the application software can be used to target a particular location and provide the user with data regarding the user's position relative thereto. For example, if the user in FIG. 5 desired to travel to a point on boundary line 81 that abuts boundary variance area 88, the user would identify the target point on the map on the application screen. Upon touching the target location on the screen, the application would "place a pin" at that point, calculating and displaying the distance 93 to the target, as well as the nearest distance 94 to the buffer zone as the user moves in the direction of the identified target.

The present invention would also allow a user to avoid a particular area or hazard. Returning to FIG. 5, the user's data file includes marked avoidance area 98, which the user has previously identified as a location to avoid. As the user approaches area 98, the software application identifies the point in area 98 nearest to the user. Using that identified point, the application calculates and displays distance 91 from the user's current location 86 to area 98, as well as the nearest distance 92 to the buffer zone as the user moves in the direction of area 98.

Figure 6:
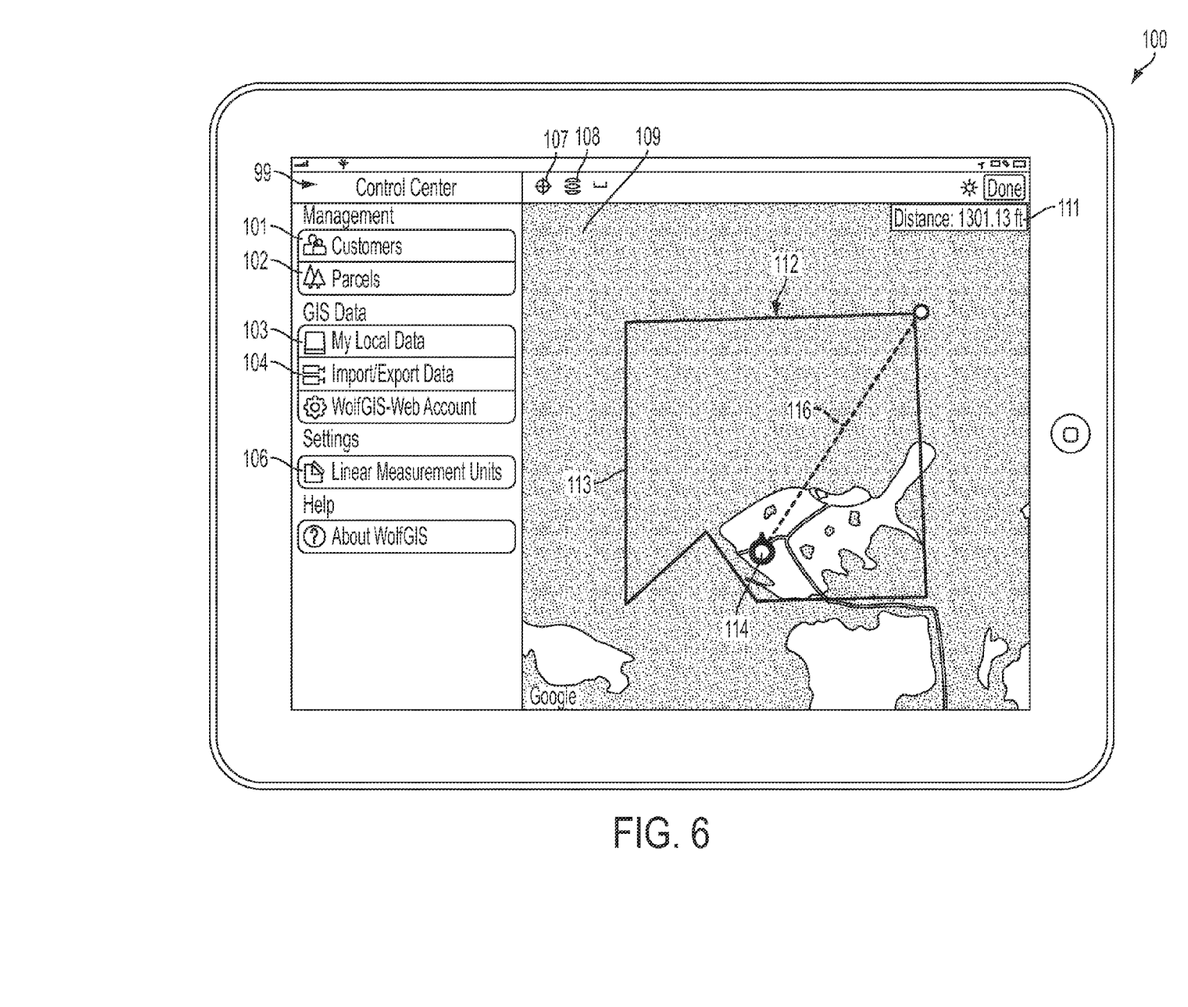
FIG. 6 is an example screen interface showing visual selection fields and control frames; and, FIG. 7 is an environmental view of an example application of a logging operation using the invention within a tract of land.

FIG. 6 depicts a sample screen interface. The user menu screen 100 is divided into two major sections: control frame 99 and a map frame 109. Control frame 99 contains several fields that allow a user to manage various aspects of the application. Customer field 101 contains a list of entities who have been previously associated with a particular land tract. Through selecting a particular entity in customer field 101, a user can immediately view a map of any land tract associated with that entity, along with any associated land tract data, such as boundary information. Similarly, parcel field 102 contains a list of all available land tracts for which data has previously been uploaded to the system. By selecting a particular parcel in parcel field 102, a user can immediately view a map of that specific parcel, along with any associated land tract data, such as boundary information.

Control frame 99 also allows a user to manage the user's GIS data. A user can import or export data to and from a variety of sources. By selecting the "My Local Data" field 103, the user can view and load geo-positional data that has been saved to the mobile device's local storage. By selecting the "Import/Export Data" field 104, a user can import or export geo-positional data through a wired or wireless connection to the Internet or another computing device. The "WolfGIS-Web Account" field allows a user to access geo-positional data stored in the data repository 36 stored on cloud server 23.

Finally, the user may select unit field 106 to modify the units of measurement in which distances are to be displayed in map frame 109.

On the application's map frame 109, compass icon 107 indicates whether the user's position data is being calculated and stored to local storage on mobile device 12. A solid compass icon 107 indicates that position data for the session is being stored; a flashing compass icon 107 indicates that the application has encountered a problem with the calculation, display, or storage of the user's position data. Information layer icon 108 indicates that additional GIS information, such as the user's current position 114, chosen target points, and land tract boundary 113, is being projected onto a satellite background as shown in map frame 109.

The sample map screen of FIG. 6 also depicts a user targeting a corner of land tract 116. Distance display 111 displays the distance between the chosen target location and the user's current location 114. Additionally, parcel overlay 112 visually depicts the shortest distance between the user's current location 114 and the target point.

Figure 7:
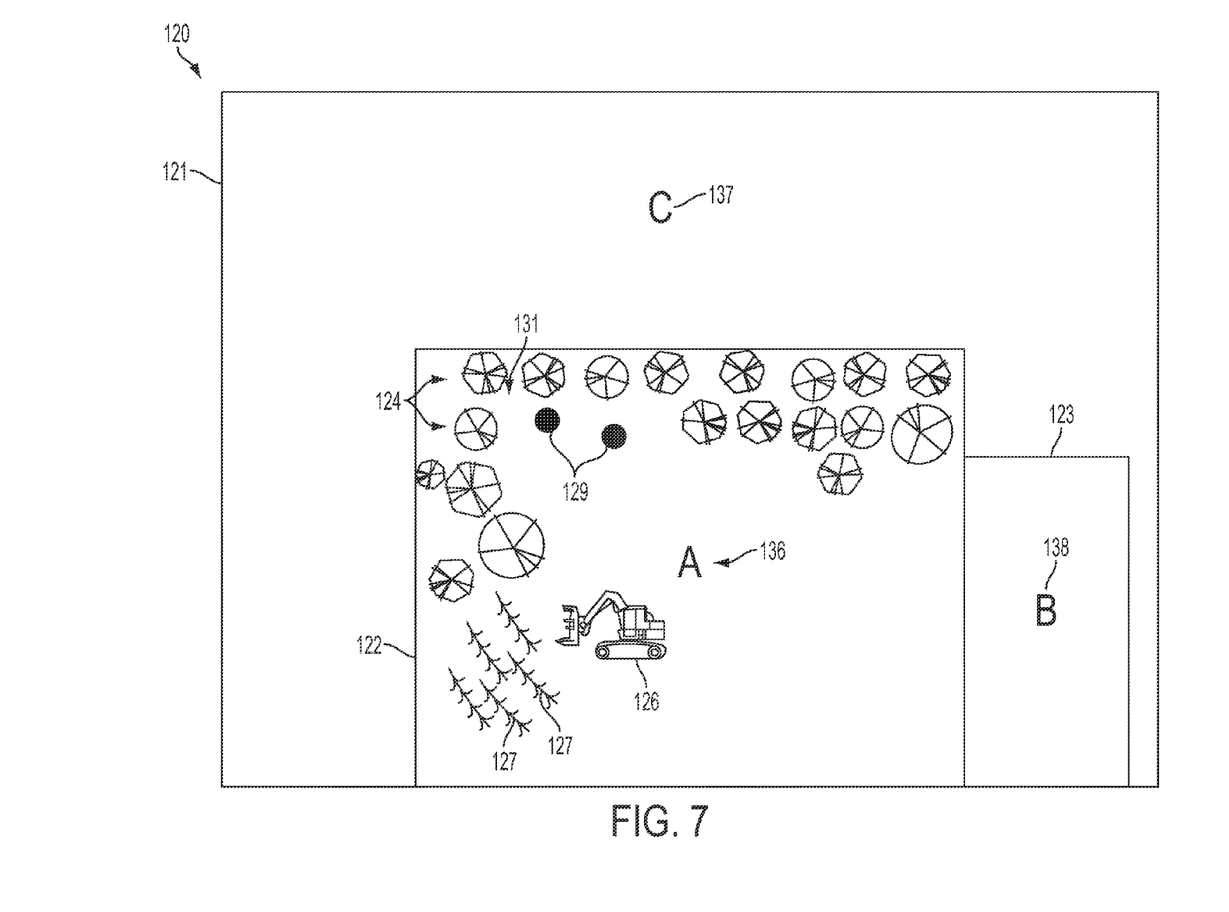

FIG. 7 illustrates an example in which the present invention is utilized in a logging scenario 120. A logging company is authorized to clear timber on parcel A 136. As cutters 129 move around parcel A 136, they are equipped with mobile device 12. Mobile device 12 is capable of receiving GPS, WiFi, cell, and Bluetooth signals. After the cutters 129 initiate the software application on mobile device 12, a satellite view of the land surrounding the cutters' location is displayed on the screen, along with control frame 99. The screen also displays the cutters' current position overlaid on map frame 109 along with tract boundary information 113.

Since the cutters are authorized to clear timber only on parcel A, they would like to overlay property lines onto a map screen. A shape file containing this data has previously been uploaded to cloud server 23, but the file is not stored locally on mobile device 12. Detecting a WiFi signal, the cutters connect to the Internet. They select the "Import/Export Data" field 104 in the control frame 99 and download the appropriate shape file from cloud server 23. Once the shape file has been retrieved from cloud server 23, the cutters select the "Parcels" field 102, further identifying Parcel A as the tract for which they intend to overlay boundary lines on satellite background 109. Once selected, boundary line 122 is displayed on the map screen.

As the cutters begin to fell trees 124, the software application continues to monitor their terrestrial position in real-time. Generally, signals from GPS satellites are utilized to triangulate the cutters' location, but occasionally, three GPS signals are not available. Mobile device 12 is also capable of triangulating the cutters' position with signals received from WiFi base stations or cell towers, but when those signals are also unavailable, the software application is able to utilize data obtained from an accelerometer-based dead-reckoning system to calculate the cutters' current position.

As cutters 129 approach boundary line 122, the velocity vector calculated by the software algorithm indicates that the cutters' current position will match a position in the designated buffer zone within 10 seconds. The map screen displays a visual warning and audible cue that the cutters are approaching the buffer zone, but because the cutters need to harvest as many trees as possible on Parcel A, they continue to proceed toward the buffer zone and into are 131. As the application detects the cutters entering the buffer zone, the map screen displays a second visual warning and a second, distinct audible cue to indicate that the cutters are located within the buffer zone. If the application detects that the cutters' current location is outside boundary 122, the map screen would display a third visual "out of bounds" warning and a third, distinct audible cue to indicate that the cutters are located outside of the designated boundary lines.

While the cutters are performing their jobs, their supervisor monitors their progress in real-time by running the software application from a remote computing device that accesses the cutters' position data on cloud server 23. Hence, with a minimum of supervision and with no physical outdoor markings, cutters are able to quickly and efficiently access logging resources without straying into unauthorized land tracts C 137 or B 138.

While I have shown my invention in one form, it will be obvious to those skilled in the art that it is not so limited but is susceptible of various changes and modifications without departing from the spirit thereof.

The invention claimed is:

1. A system for guiding the movements of a person pursuant to global positioning information, comprising:
   a. an electronic device held by said person having means for communicating wirelessly through the internet to a remote internet protocol address, means for determining a latitude and longitude for said device on the Earth, a battery, a speaker, a universal serial port external connector, means for communicating over a cellular network, and means for controlling the internal electronics of said device;
   b. means running on said device for loading a geographic position boundary;
   c. means running on said device for calculating whether said person is geographically positioned within said boundary and taking actions to communicate to said person their position relative to said boundary; and,
   d. server means in communication with said device for remotely managing a database record holding information associated with the location, status, and geo-positioning boundary files associated with said person.

2. The system as recited in claim 1, further including means running on said device for calculating a geographic position boundary upon the receipt of a land tract file holding geographic information representing the perimeter of a land tract represented by said land tract file, and wherein said boundary corresponds to said perimeter of said land tract.

3. The system as recited in claim 2, further including means resident on said server means for accepting an uploaded land tract file and associating said land tract file with said database record.

4. The system as recited in claim 3, further including a display for displaying said person's position on said land tract.

5. A system for guiding the movements of a person pursuant to global positioning information, comprising:
   a. an electronic device held by said person having means for communicating wirelessly through the internet to a remote internet protocol address, means for determining a latitude and longitude for said device on the Earth, a battery, a speaker, a universal serial port external connector, means for communicating over a cellular network, and means for controlling the internal electronics of said device;
   b. means running on said device for loading a geographic position boundary;
   c. means running on said device for calculating whether said person is geographically positioned within said boundary and taking actions to communicate to said person their position relative to said boundary; and,
   d. means running on said device for calculating a geographic position boundary upon the receipt of a land tract file holding geographic information representing the perimeter of a land tract represented by said land tract file, and wherein said boundary corresponds to said perimeter of said land tract.

6. The system as recited in claim 5, further including means resident on said server means for accepting an uploaded land tract file and associating said land tract file with said database record.

7. The system as recited in claim 6, further comprising means running on said serve means for managing a plurality of land track files associated with said person and downloading said files into said electronic device upon request by said person.

8. The system as recited in claim 7, further including a display for displaying said person's position on said land tract.

9. In an electronic device held by a person having means for communicating wirelessly through the internet to a remote internet protocol address, means for determining a latitude and longitude for said device on the Earth, a battery, a speaker, a universal serial port external connector, means for communicating over a cellular network, and means for controlling the internal electronics of said device, a method of guiding the movements of said person within a tract of land comprising the steps of:
   a. loading geographical information representing a tract of land into said electronic device;
   b. calculating a geographic boundary comprising a perimeter of said land tract; and; and,
   c. continuously monitoring said person's geographic position within said land tract and issuing a notification warning upon the transit of said boundary.

10. The method as recited in claim 9, further including the step of downloading a land tract file into said electronic device.

11. The method as recited in claim 10, further including the step of communicating over a global communications network with a database computer managing a database record representing geographical information associated with said person.

12. The method as recited in claim 11, further including the step of uploading a plurality of land tract files to a database computer and associating those files with a geographic profile of said person.

13. The method as recited in claim 12, further including the step of continuously updating said database record with position, trajectory, and travel history of said person.

14. The method as recited in claim 13, further including the step of displaying the position of said person on said land tract in association with a map overlay.

15. The method as recited in claim 14, further including the step of calculating a buffer zone prior to transiting said boundary and issuing a notification warning upon the transit into said buffer zone.

16. The method as recited in claim 15, further including the step of loading boundary information of excluded zones within said land tract and issuing a notification warning upon the transit into one of said exclusion zones.

17. The method as recited in claim 9, further including the step of loading boundary information of excluded zones within said land tract and issuing a notification warning upon the transit into said exclusion zones.

18. The method as recited in claim 17, further including the step of uploading a plurality of land tract files to a database computer and associating those files with a geographic profile of said person.

19. The method as recited in claim 9, further including the step of issuing a warning responsive to events selected from the group consisting of exceeding a forward speed prediction limit associated with an approaching boundary transit event, transiting a buffer zone adjacent to the closest boundary point to said person within said land tract, transiting a boundary of an exclusion zone, and transiting a specified minimum distance to a nearest exclusion zone position within 45 degrees of a vector representing the current forward movement bearing of said person.

20. The method as recited in claim 19, further including the step of said person marking out a line segment on a display of said electronic device in which a map overlay of said land tract appears, and calculating and displaying the distance marked out by said segment.

* * * * *